(12) United States Patent
Nilssen et al.

(10) Patent No.: US 12,276,427 B2
(45) Date of Patent: Apr. 15, 2025

(54) COOKING APPLIANCE AND CONTROL KNOB WITH INTEGRATED DISPLAY

(71) Applicant: Hestan Commercial Corporation, Anaheim, CA (US)

(72) Inventors: Raymond Nilssen, Fairhope, AL (US); Jairad Sloyer, Rancho Santa Margarita, CA (US)

(73) Assignee: Hestan Commercial Corporation, Anaheim, CA (US)

( * ) Notice: Subject to any disclaimer, the term of this patent is extended or adjusted under 35 U.S.C. 154(b) by 465 days.

(21) Appl. No.: 17/371,469

(22) Filed: Jul. 9, 2021

(65) Prior Publication Data

US 2022/0010966 A1 Jan. 13, 2022

Related U.S. Application Data

(60) Provisional application No. 63/050,676, filed on Jul. 10, 2020.

(51) Int. Cl.
*G06F 3/0488* (2022.01)
*F24C 3/12* (2006.01)
(Continued)

(52) U.S. Cl.
CPC .............. *F24C 7/086* (2013.01); *F24C 3/124* (2013.01); *F24C 3/126* (2013.01); *G06F 3/0362* (2013.01);
(Continued)

(58) Field of Classification Search
None
See application file for complete search history.

(56) References Cited

U.S. PATENT DOCUMENTS

| 11,705,123 B1* | 7/2023 | Chu ........................ G06F 3/167 |
| | | 704/275 |
| 2013/0056457 A1* | 3/2013 | Lee ...................... G06F 3/04883 |
| | | 219/620 |

(Continued)

OTHER PUBLICATIONS

DiTuroProductions, "Induction Cooking: Power vs. Temperature Settings (DiTuro Productions)", Publication Date: Aug. 24, 2018. Publisher Youtube. URL: https://www.youtube.com/watch?v=j72zl3TVzyc.*

*Primary Examiner* — Matthew Ell
*Assistant Examiner* — David V Luu
(74) *Attorney, Agent, or Firm* — Akerman LLP

(57) ABSTRACT

A control knob for an appliance deploys a round bezel region that surround a fixed electronic display panel that is touch sensitive. The appliance state or operating condition is modified by the user rotating the bezel and selecting graphic user interface (GUI) icons on the electronic display. The bezel orientation modifies the GUI to display icons that operate the appliance in different modes. In a first mode of power control, the GUI displays power levels and the bezel orientation modifies the power level. In a second mode, the GUI displays temperature settings and the bezel orientation modifies the temperature. The GUI displays icons that when activated switch between the first and second mode as well as turn off the appliance. Another icon may activate a third mode that enables control and display of other settings, such as temperature units, time and date, count down timers and the like.

13 Claims, 3 Drawing Sheets

(51) Int. Cl.
   *F24C 7/08* (2006.01)
   *G06F 3/0362* (2013.01)
   *G06F 3/04817* (2022.01)
   *G06F 3/04847* (2022.01)
   *H05B 3/68* (2006.01)

(52) U.S. Cl.
   CPC ...... *G06F 3/04817* (2013.01); *G06F 3/04847* (2013.01); *G06F 3/0488* (2013.01); *H05B 3/68* (2013.01); *H05B 2213/06* (2013.01); *H05B 2213/07* (2013.01)

(56) References Cited

U.S. PATENT DOCUMENTS

| | | | |
|---|---|---|---|
| 2017/0163437 A1* | 6/2017 | Yang | G05B 11/01 |
| 2018/0279422 A1* | 9/2018 | Davenport | H05B 6/1209 |
| 2020/0304445 A1* | 9/2020 | Dinhthi | G06F 3/0481 |
| 2021/0095859 A1* | 4/2021 | Park | F24C 7/082 |

\* cited by examiner

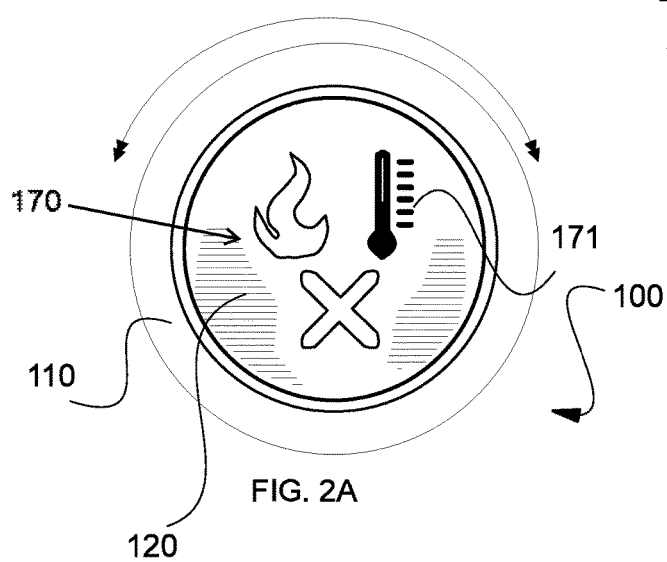
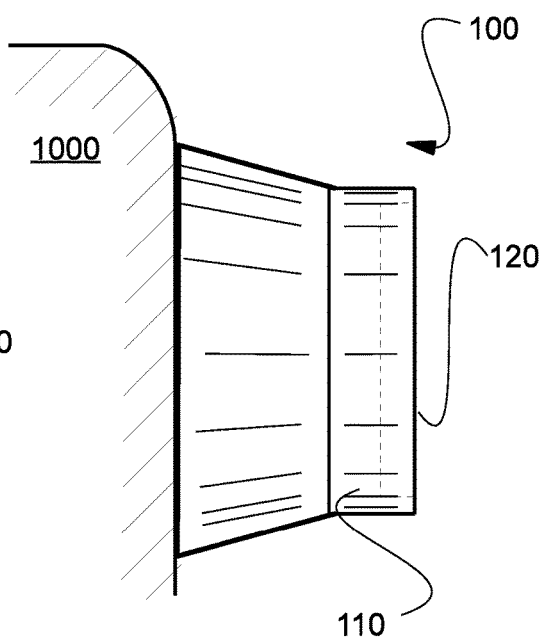
FIG. 2A
FIG. 2B
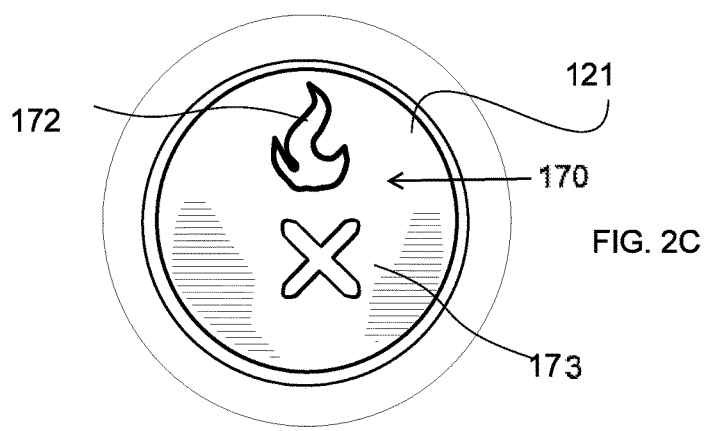
FIG. 2C
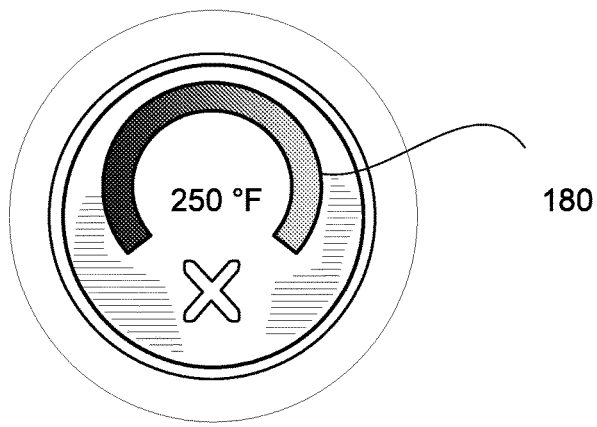
FIG. 2D

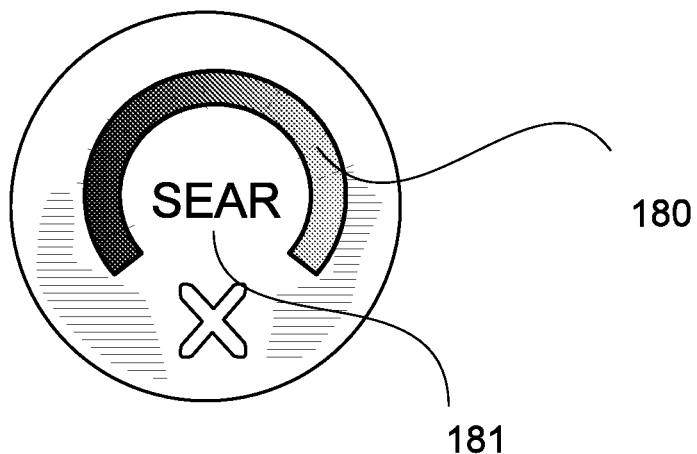
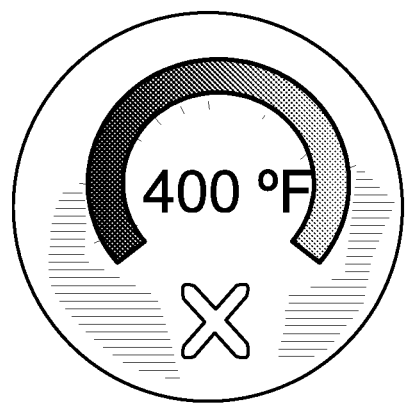
FIG. 3A                FIG. 3B
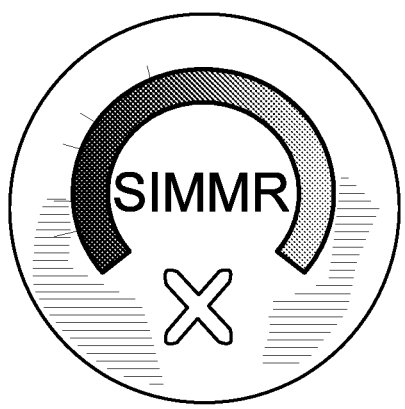
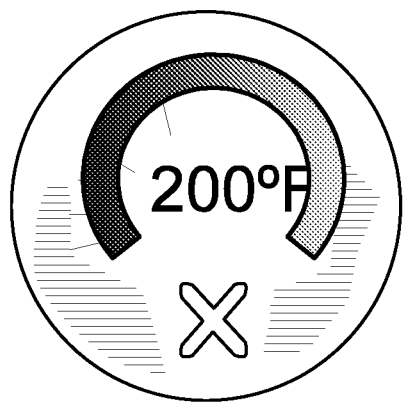
FIG. 3C                FIG. 3D

COOKING APPLIANCE AND CONTROL KNOB WITH INTEGRATED DISPLAY

CROSS REFERENCE TO RELATED APPLICATIONS

The present application claims the benefit of U.S. provisional patent application 63/050,676, filed Jul. 10, 2020. The contents of which is hereby incorporated herein by reference.

TECHNOLOGY

The present description relates to cooking appliances such as ranges and ovens that receive a cooking vessel, such as pots, pans, and griddles on a horizontal surface in which the appliance has a heat source to heat the vessel. More particularly, the present description relates to the display and control of the mode of heat to the cooking vessel.

BACKGROUND

Cooking vessels capable of measuring and displaying cooking temperature are known, and include vessels with attached heating elements, such as hot plates, electric fry pans and the like, as well as vessels that are separable from the heat source.

Cooking appliances that are not integrated with a vessel typically operate in a constant power mode in which an analog or digital control system modulates the power applied by the heating element.

However, cooking vessels have recently been commercialized that, while not integrated with heating elements, can transmit the current temperature to a controller, and the controller can modulate the output of the heating element to control the temperature to a predetermined value.

The controller may be integrated into the appliance and directly modulate the power to the heating element. In such appliances, there is a need to select the pre-determined temperature as well as operate, in the alternative, a control mode of the heat source merely providing a constant output that is preselected.

It has been proposed that various appliances have control knobs that can be rotated to select a temperature or power level, and then on a display on the knob, indicate the power level or temperature.

While consumers are used to following baking recipes in which a temperature of the oven is pre-set, recipes for cooking in pots, pans or griddles that are placed on stove tops typically refer to setting a power level and waiting until a transformation of the food stuffs is apparent, or otherwise describe setting the power level to give an on-going appearance change of the food. In the latter case, a sauce might be set at a power level that causes it to boil or simmer until a predetermined time has elapsed, or in the case of a power level, it might be selected to sear or brown food quickly until cooked throughout.

Experienced cooks and chefs cooking familiar food stuffs have sufficient experience and judgment to adjust the output level of a power source to provide such a response in the cookware vessel being used.

Less experienced cooks benefit from precise temperature control of the vessel coupled with exact timing for the cooking process, based on the recipe size and/or the food stuff thickness. However, even experienced chefs and cooks can benefit from a precise control of temperature to obtain more consistent results day to day, or when using a different range or cooking vessel. Precise temperature control and timing also allows all cooks to devote time to other tasks and avoid the need to constantly monitor the cooking progress or ensure that the output level of the heat source is neither too high or low to provide the expected results.

SUMMARY

As it is desirable for cooking appliances to allow both modes of cooking in vessel, that is by power output control as well as temperature control, there is a need for a simple, convenient and reliable method to select between these modes, set the power or temperature level in the mode selected, and provide at least one of visual or auditory feedback of the selection and optionally reminders thereof.

In various embodiments, the first object is achieved by providing a cooking appliance comprising a platform or support for supporting a cooking vessel. In one example, the platform may be horizontal. At least one heat source may be disposed below at least a portion of the platform. Aa controller for modifying the output of the heat source may be provided along with a control knob to enable a user select a desired operating condition of the controller. The control knob may include an electronic display screen that is touch sensitive to provide a graphic user interface (GUI). In one example, the electronic display may be provided on a face of the control knob. In a further example, the electronic display has a shape corresponding to a shape of the control knob. In an above or another example, the electronic display is circular. A bezel may surround the electronic display and be configured to rotate freely about the electronic display. In one example, a ring shaped bezel may be configured to rotate freely about a circular electronic display. The controller or control knob may be equipped with a sensor configured to determine the relative orientation of the bezel. A display controller may be provided and be configured to be in signal communication with the sensor to obtain the relative orientation of the bezel and, in response thereto, modulate the GUI. The GUI may be configured to display one or more icons on display screen. The one or more icons may be responsive to contact of a user to select an operating condition of the controller such that the heat source provides one of a constant power output level in which the relative orientation of the bezel is operative define the power output parameter by selecting an associated value of the constant power output with respect to the operating condition, or sufficient power to maintain a predetermined temperature in a cooking vessel in a constant temperature operating condition The bezel may be operable to modify a parameter of a selected operating condition. The parameter or value thereof may be displayed on the GUI. For example, when the icon for the constant power level is selected, the GUI displays an indication of the potential constant power output value in response to the relative orientation of the bezel set by the user. When the icon for constant temperature is selected, the GUI displays an indication of the relative orientation of the bezel corresponding to a temperature value set by the user associated with the relative orientation of the bezel. Thus, the user may use the bezel to define a parameter associated with a selected operational condition by rotating the bezel to a desired value for the parameter.

A second aspect is characterized in that the GUI may further be operative to alternate between displaying a predetermined temperature and at least one of a word or abbreviation for a cooking phase associated with the predetermined temperature.

A further aspect to any of the above aspects is characterized in that the cooking vessel may include a thermal sensor to measure temperature and a transmitter to transmit a temperature measured by the thermal sensor in which the controller has or is in signal communication with a receiver that receives the measured temperature from the transmitter. In a further embodiment, the controller analyzes the measured temperature and modulates the power output of the heat source to obtain or retain a desired or potential constant temperature selected by a user via the bezel.

In one aspect, a cooking appliance includes a heat source, controller, control knob, and a display controller. The heat source heat source may be configured to heat a cooking vessel or contents of a cooking vessel. The controller may be operable to control output of the heat source to conform the output to one or more operating conditions. The control knob is operable to select the operating condition of the controller. The control knob may include an electronic display screen. At least a portion of the electronic display screen may be touch sensitive to provide a graphic user interface (GUI) to interface a user with one or more of the operations of the control knob. The GUI may be configured to display one or more icons on the touch sensitive portion of the electronic display screen to be responsive to contact of the user. Contacting one of the one or more icons by the user selects one of the one or more operating conditions. The control knob may also include a bezel and a sensor. The bezel may be positioned around the electronic display and be configured to rotate relative to the electronic display when manipulated by the user to control a parameter of the selected operating condition. The sensor may be configured to determine the relative orientation of the bezel. The display controller may be in signal communication with the sensor to obtain the relative orientation of the bezel and modulate the GUI to display a value for the parameter of the selected operating condition that corresponds to the relative orientation of the bezel.

In one example, the one or more operating conditions comprise a constant power output level in which the controller controls the output of the heat source to output a level of constant power and the relative orientation of the bezel is operative to select a value for the level of constant power output.

In the above or another example, the one or more operating conditions comprise sufficient power to maintain a predetermined temperature in a cooking vessel positioned to be heated by the heat source, and the relative orientation of the bezel is operative to select a value for the predetermined temperature. In one configuration, the GUI is further operative to alternate between displaying the value for the predetermined temperature and at least one of a word or abbreviation for a cooking phase associated with the predetermined temperature. In a further or another configuration, the cooking appliance includes the cooking vessel and the cooking vessel has a thermal sensor to measure the temperature and a transmitter to transmit a temperature measured by the thermal sensor in which the controller has or is in signal communication with a receiver that receives the measured temperature from the transmitter.

In any of the above or another example, the one or more operating conditions comprise a constant power output level and sufficient power to maintain a predetermined temperature in a cooking vessel positioned to be heated by the heat source. In one configuration, when the icon corresponding to the constant power output level is contacted, the relative orientation of the bezel is operative to select a value for the level of constant power output and the GUI displays an indication of the constant power output value in response to the relative orientation of the bezel. In the above or another configuration, when the icon corresponding to sufficient power to maintain a predetermined temperature is selected, the relative orientation of the bezel is operative to select a value for the predetermined temperature and the GUI displays an indication of the predetermined temperature value in response to the relative orientation of the bezel. The GUI may be further operable to alternate between displaying the value for the predetermined temperature and at least one of a word or abbreviation for a cooking phase associated with the predetermined temperature. The cooking vessel may have a thermal sensor to measure the temperature and a transmitter to transmit a temperature measured by the thermal sensor in which the controller has or is in signal communication with a receiver that receives the measured temperature from the transmitter. When the icon corresponding to the constant power output level is contacted, the relative orientation of the bezel may be operative to select a value for the level of constant power output and the GUI may display an indication of the constant power output value in response to the relative orientation of the bezel.

In any of the above or another example, the GUI further displays an icon for deactivation of the heat source, and contact with the deactivation icon causes the controller to deactivate the heat source.

In any of the above or another example, the GUI further displays an icon for activation of the heat source, and contact with the activation icon causes the controller to activate the heat source.

In any of the above or another example, the heat source comprises a gas burner, and the controller is operable to control the output of the heat source by controlling a valve that modifies gas flow to the gas burner.

In any of the above or another example, the heat source comprises a heat source powered by electrical energy and the controller is operable to control the output of the heat source by modifying electrical current supplied to the heat source. The heat source powered by electrical energy may be selected from one or more of an induction coil, an infrared light emitting lamp, or a thermal resistance heating element.

According to another aspect, a control knob operable to select an operating condition of a controller configured to control an output of a heat source of a cooking appliance includes an electronic display screen, a bezel, a sensor, and a display controller. At least a portion of the electronic display screen may be touch sensitive to provide a graphic user interface (GUI) to interface a user with one or more of the operations of the control knob. The GUI may be configured to display one or more icons on the touch sensitive portion of the electronic display screen to be responsive to contact of the user. Contacting one of the one or more icons by the user selects one of the one or more operating conditions. The bezel may be positioned around the electronic display and be configured to rotate relative to the electronic display when manipulated by the user to control a parameter of the selected operating condition. The sensor may be configured to determine the relative orientation of the bezel. The display controller may be in signal communication with the sensor to obtain the relative orientation of the bezel and modulate the GUI to display a value for the parameter of the selected operating condition that corresponds to the relative orientation of the bezel. The one or more operating conditions may include a constant power output level, and sufficient power to maintain a predetermined temperature in a cooking vessel positioned to be heated by the heat source. When the icon corresponding to the constant power output level is contacted, the relative orientation of the bezel is operative to select a value for the level of constant power output and the GUI displays an indication of the constant power output value in response to the relative orientation of the bezel. When the icon corresponding to sufficient power to maintain a predetermined temperature is selected, the relative orientation of the bezel is operative to select a value for the predetermined temperature and the GUI displays an indication of the predetermined temperature value in response to the relative orientation of the bezel.

The above and other objects, effects, features, and advantages of the present disclosure will become more apparent from the following description of the embodiments thereof taken in conjunction with the accompanying drawings.

BRIEF DESCRIPTION OF THE DRAWINGS

FIG. 2A is a schematic front elevation view of the control knob showing the GUI on the electronic display in a first state.

FIG. 2B is a schematic side elevation view of the control knob.

FIG. 2C is a schematic front elevation view of the control knob showing the GUI on the electronic display in another state.

FIG. 2D is a schematic front elevation view of the control knob showing the GUI on the electronic display in another state.

FIG. 3A is a schematic front elevation view of the control knob showing the GUI on the electronic display in another state.

FIG. 3B is a schematic front elevation view of the control knob showing the GUI on the electronic display in an alternative to the state in FIG. 3A.

FIG. 3C is a schematic front elevation view of the control knob showing the GUI on the electronic display in another state.

FIG. 3D is a schematic front elevation view of the control knob showing the GUI on the electronic display in an alternative to the state in FIG. 3C.

DESCRIPTION

Figure 1:
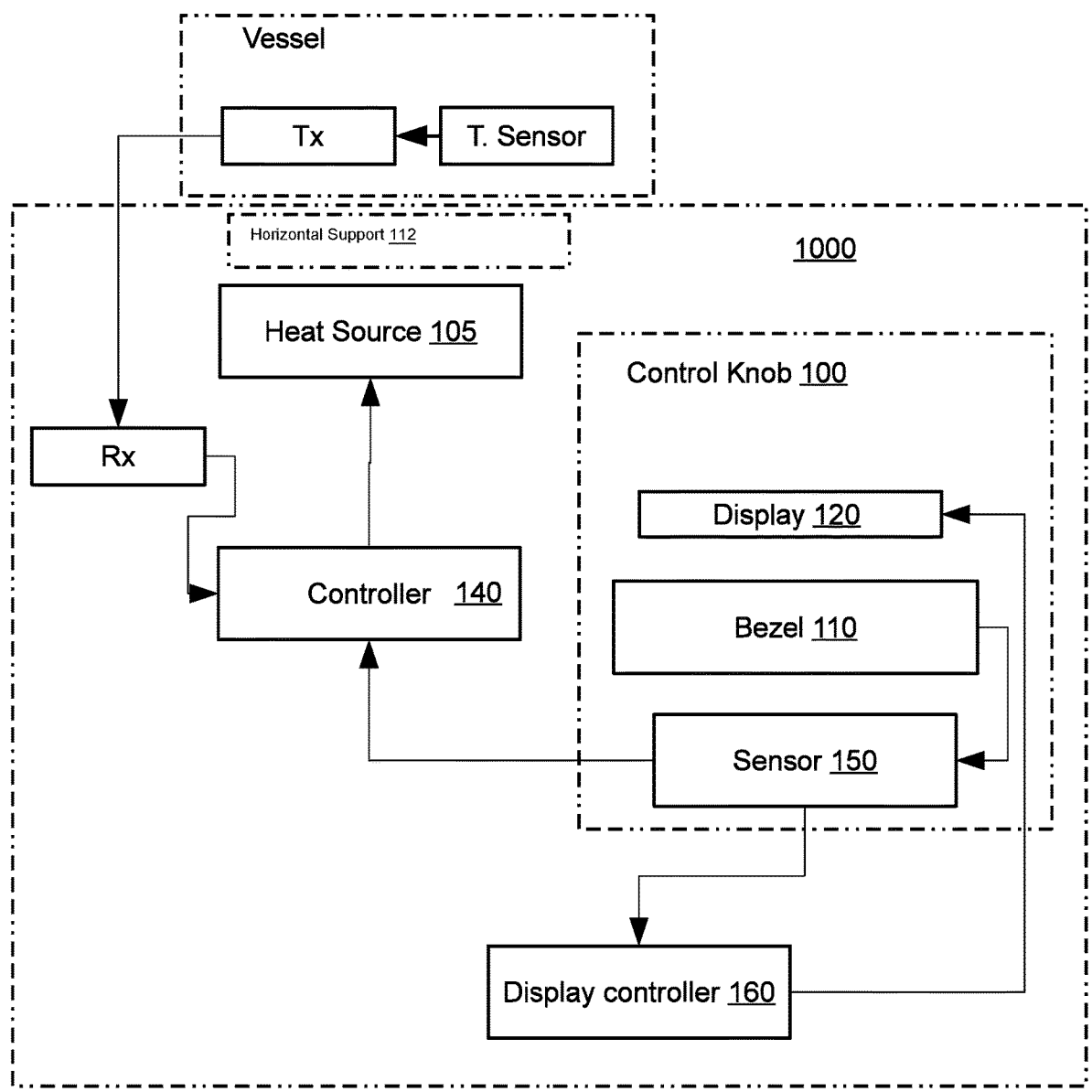
FIG. 1 is a schematic block diagram of a cooking system that includes the cooking appliance.

Referring to FIGS. 1-3D, wherein like reference numerals refer to like components in the various views, there is illustrated therein a new and improved Cooking Appliance and Control Knob with Integrated Display, generally denominated 100 herein.

In accordance with the present disclosure, the cooking appliance 1000 deploys a control knob 100 that comprises a bezel 110 and an electronic display 120.

The cooking appliance 1000 also has a platform 112 for supporting a cooking vessel, neither which is illustrated other than symbolically in FIG. 1. The platform 112 will typically be horizontal. Further, in some embodiments, the cooking appliance 1000 may be equipped with a heat source 105, such as a gas burner, that provides the cooking heat, and which is typically disposed beneath the platform 112. In some embodiments, the cooking appliance 1000 may include additional or other heat sources 105 in addition to or instead of a gas burner. For example, the heat source 105 may be via electrical energy, such as induction coils, an infrared light emitting lamp, or a thermal resistance heating element that provides heating output to the vessel, which may be direct by applying heat to or generating heat in the vessel or its contents or indirect by applying heat to or generating heat in the platform 112. The cooking appliance may also include a controller 140. The controller 140 may be in signal communication with the heat source 105 and be operable to regulate the amount of heating power, e.g., fuel or electric current, supplied to the heat source or otherwise modulate the heating output of the heat source. For example, the controller 140 may be configured to regulation the amount of gas supplied to a gas burner heat source 105, or in the case of electronic or electric heat sources 105, the amount of electrical current supplied to the heat source 105.

The control knob 100 may be operable to interface the user with the operating conditions of the controller 140, which may include parameters or values of such parameter with respect to the operating conditions. For example, the control knob 100 may be configured to allow users to select the operating conditions of the controller 140 and define one or more parameters associated with the operating condition.

In certain embodiments, described further below, the control knob 100 may be configured to allow the user to energize the heat source 105 to provide a constant level of power for cooking according to a selected operational condition. In some embodiments, control knob 100 may be further operable to allow the user to control the power level parameter of the operating condition by setting a value for the desired power level.

In the case of using cookware vessels that can measure the temperature of either the food in the vessel or the interior cooking surface, the controller 140 may be configured to be operative to regulate the heating power to the heat source 105 to obtain a predetermined and desired temperature value. In some embodiments, control knob 100 may be further operable to allow the user to control a temperature parameter of the operating condition by setting a value for the predetermined or desired temperature.

As shown in FIG. 1, such a vessel may also have a thermal sensor or probe for inserting in the vessel content, which is connected to a transmitter (Tx) that sends the measured temperature to a receiver (Rx) that is in signal communication with the controller 140. In some embodiments, the controller 140 may be (or may include or may utilize) a proportional-integral-derivative (PID) controller to control cooking temperatures. Examples of such a PID controller are described in U.S. Patent Application Publication No. 2018/0070756 entitled "Adaptive Thermal Control For a Cooking System", which is incorporated herein by reference.

To interface the operations of the controller 140 to the user via the control knob 100, the control knob 100 may include various user interface features. For example, the control knob 100 may include one or more user interface features integrated or associated with a graphical display 120 to provide a graphical user interface. In some embodiments, a user interface may incorporate tactile or haptic interfacing elements, such as a selectable or otherwise interactive button, icon, or indicator, such as a tactile switch, rotatable bezel, wheel, or toggle, or a touch screen or touch sensitive technology such as capacitance sensors, presence sensors, pressure sensors, optical sensors, or vibration sensors, which the user may touch and/or actuate to provide control instructions to the controller 140 via interaction with the control knob 100. For example, the control knob 100 may include a user interface incorporating a physical or virtual bezel around the control knob 100 that a user may touch or turn to provide control instructions to the controller 140 via interaction with the control knob 100. A display for a graphical user interface may be located along one or more surfaces or areas of the control knob 100. For example, a display may be provided around or along a perimeter or face of the control knob 100. The display may be shaped to correspond to a shape or profile of the control knob 100, or may have a different shape. Icons may be displayed on the display and a user may touch or interact with the icon to provide control instructions.

In the illustrated embodiment, the control knob 100 includes multiple user interface elements to assist the user in providing control instructions. The control knob 100 includes an electronic display screen 120 that is touch sensitive to provide a graphic user interface (GUI) 121. The electronic display screen 120 is shown in the center of the control knob 100 in the illustrated embodiment and has a circular shape, which corresponds to the profile of the control knob 100. A bezel 110 surrounds the circular electronic display 120 and is configured to rotate freely about the electronic display 120 in response to interaction by a user. The control knob 100 also comprises a sensor 150 that determines the relative rotational position of the bezel 110. The sensor 150 is optionally a rotary encoder.

The sensor 150 in turn is in signal communication with a display controller 160. The display controller 160 may use memory or a logic device, such as a microprocessor, to determine what information should be displayed on the electronic display 120, and the area on the display that when contacted by the user provides characteristic signal for setting other display conditions or operating characteristics of the appliance 1000. Hence, the display controller 160 may also receive input from a capacitive touchscreen or resistive touchscreen of the electronic display 120. The inputs to the display controller 160 may be provided when a user contacts specific icons, identified generally as icons 170, that are displayed on the GUI 121 of the electronic display 120. In various embodiments, an icon may be selected to select an operational condition and the bezel 110 may be manipulated to define an associated parameter or value thereof for the selected operational condition. Accordingly, in operation, the display controller 160 is in signal communication with the sensor 150 to obtain the relative orientation of the bezel 110 and, depending on the mode selected by the touch screen of the display 120, provides a different mode to modifying the heat source 105 output.

In response to the rotational position of the bezel 110, the display controller 160 is configured to modulate the GUI 121, in which the GUI 121 is capable of displaying one or more icons 170 on the GUI 121 wherein the one or more icons 170 are responsive to contact of a user to select an operating condition of the display controller 160. The display controller 160 may store the icon configuration and logic in a memory that is part of or in communication with a microprocessor of the controller 160. It is to be appreciated modifying, changing, or reassigning the operations of the icons and bezel are within the scope of the present disclosure.

The operating conditions of the display controller 160 are optionally for the heat source 105 to be operated at a constant power output level in which the relative orientation of the bezel 120 is operative to define the constant power output parameter by selecting a desired value of the constant power output. In an alternative operating mode of the controller 140, the heat source 105 is supplied with sufficient power to maintain a predetermined temperature in the cooking vessel that is disposed on the support platform 112. In this mode, the relative orientation of the bezel 110 is operative to select the predetermined temperature by the user rotating the bezel 100 while the temperature associated with the current orientation is displayed on the electronic display 120. Hence, the user may simply rotate the bezel 110 until the display 120 provides the desired temperature. Various icons 170 that are part of the graphic user interface 121, such as icons 171-173, may be selected by the user to alternate between these modes of operation, or when the desired temperature is selected by the rotation of the bezel 110, to energize the heat source 105 so that the internal temperature of a food item cooked or the cookware vessel itself reaches this temperature. If the user desires to operate at a constant power output level, they may first preselect the appropriate icon 172 (the outline of a flame) on the display 120, at which point the display 120 may transition to indicate a power level between, for example, 0 and 10 to represent no power and hundred percent of the available power. The user may then rotate the bezel 110 until the display 120 changes to the desired power level, say, for example, a power level of seven. The user may then activate another icon 170 to energize the heat source 105 via the controller 140 to provide this level of power. The icon to energize the power source may be a power icon 170, such as a circle or X icon that is used for deactivation in the illustrated example, or may be similar or the same to the flame icon 172 representing constant power. In some instances, the icon 170 used to select the mode may be presented for activating heating power before or after setting a desired parameter, such as temperature or constant power. The GUI 120 may modify the icon 170 appearance to indicate heating power is activated or not activated, such as by illuminating one or more portions of the icon 170, modifying illumination areas or colors of the icon 170, or addition or removal of elements of the icon 170. When the icon 170 for the controller 140 to maintain a predetermined temperature is selected, such as icon 171, the GUI 121 displays an indication of the value for the potential constant temperature parameter in response to the relative orientation of the bezel 110.

In preferred embodiments the cooking vessel may have a thermal sensor to measure the temperature and a transmitter to transmit a temperature measured by the thermal sensor to the controller 140 via the receiver. Examples of cooking vessels and devices that include thermal sensors and transmitters are described in U.S. Pat. No. 10,499,759 entitled "Cooking Vessel with a Thermal Sensor", U.S. Patent Application Publication No. 2017/0238751 entitled "Wirelessly Controlled Cooking System", U.S. Patent Application Publication No. 2018/0242772 entitled "Cooking System with Error Detection", and U.S. Patent Application Publication No. 2019/0125120 entitled "Cooking System for Tracking a Cooking Device", each of which is incorporated herein by reference.

FIGS. 2A-2D illustrate the control knob 100 in different views to show the bezel 110 and various icons 170-173 that may be illustrated for different modes of operation on the display 120. In FIG. 2A the display 120 has a GUI icon 173 "X" to allow user to de-energize the heat source 105 of the cooking appliance 1000, as well as another icon 171 of a thermometer allowing the user to select the constant temperature mode. The third icon 172 is a flame to select the constant power mode. In FIG. 2C the display 120 has changed state to provide only the flame icon 172 and the "X" icon 173 to allow the user to de-energize the heat source 105, such as by restricting the flow of gas to a burner. In FIG. 2D there is an arc-shaped bar graph 180 as well as a numerical representation 181 of the temperature (which can be selected to be in Centigrade or Fahrenheit) that is selectable by the bezel 110 orientation. The bar graph 180 may change gradually from one side to the other wherein the angular position from the left or right corresponds with temperature, or it may simply change color to represent when the setpoint temperature selected with the bezel 110 has been reached.

FIGS. 3A-3D illustrate alternative settings or information conveyed by the display 120 in the temperature control mode. An optional mode of operation is when, for example, the bezel 110 position has been selected to achieve a temperature of 400° F. the display 120 may alternate between the graphical user interface 121 shown in FIG. 3B where temperature value "400° F." is displayed, versus the display mode in FIG. 3A where the word "SEAR" is displayed in region 182. Displaying the word "SEAR" is to remind the user that at 400° F., foods are being seared such as to develop a brown crust. FIG. 3C and FIG. 3D illustrate an alternative example, when the display 120 can be configured to alternate between the words "SIMMR", to remind the user the current temperature setting will result in the food simmering, at 200° F., that is being maintained at a temperature just below the boiling point. The alternative display modes allow a user to follow cooking recipes and instructions that do not provide specific temperature, or cook from knowledge of past experience where they understand intuitively the type of food transformation process they are achieving, but not an optimum temperature for it.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A cooking appliance comprising:
a platform for supporting a cooking vessel,
at least one heat source disposed below at least a portion of the platform,
a controller for modifying output of the heat source,
a control knob to select an operating condition of a plurality of operating conditions of the controller, wherein the control knob comprises:
  a circular electronic display screen that is touch sensitive to provide a graphic user interface (GUI),
  a bezel surrounding the circular electronic display, the bezel being configured to rotate freely about the circular electronic display,
  a sensor to determine the relative orientation of the bezel,
  a display controller in signal communication to obtain the relative orientation of the bezel and in response thereto modulate the GUI, in which the GUI is capable of displaying a plurality of icons on the GUI, wherein the plurality of icons are responsive to contact of a user to select the operating condition of the plurality of operating conditions of the controller, wherein the plurality of icons comprise a constant power output icon that is associated with a constant power output operating condition of the plurality of operating conditions, and further comprise a predetermined temperature icon that is associated with a predetermined temperature operating condition of the plurality of operating conditions, wherein, following a selection by the user of the constant power output icon:
the controller is configured to cause the heat source to provide a constant power output to the cooking vessel that is disposed on the platform in which the relative orientation of the bezel is operative to select a value of the constant power output, and
the GUI is configured to display an indication of the value of the constant power output in response to the relative orientation of the bezel, and wherein, following a selection by the user of the predetermined temperature icon:
the controller is configured to cause the heat source to provide sufficient power to maintain a predetermined temperature in the cooking vessel that is disposed on the platform in which the relative orientation of the bezel is operative to select the predetermined temperature, and
the GUI is configured to alternate between displaying the predetermined temperature and at least one of a word and abbreviation for a cooking phase associated with the predetermined temperature.

2. The cooking appliance according to claim 1 in which the cooking vessel has a thermal sensor to measure the temperature and a transmitter to transmit a temperature measured by the thermal sensor in which the controller has or is in signal communication with a receiver that receives the measured temperature from the transmitter.

3. A cooking appliance comprising:
a heat source configured to heat a cooking vessel or contents of a cooking vessel;
a controller configured to control output of the heat source; and
a control knob configured to select an operating condition of a plurality of operating conditions of the controller, the control knob comprising:
  an electronic display screen, wherein at least a portion of the electronic display screen is touch sensitive to provide a graphic user interface (GUI) to interface a user with one or more operations of the control knob, wherein the GUI is configured to display a plurality of icons on the touch sensitive portion of the electronic display screen to be responsive to contact of the user, and wherein contacting one of the plurality of icons by the user selects one of the plurality of operating conditions, wherein the plurality of icons comprise a constant power output icon that is associated with a constant power output operating condition of the plurality of operating conditions, and further comprise a predetermined temperature icon that is associated with a predetermined temperature operating condition of the plurality of operating conditions,
  a bezel positioned around the electronic display, wherein the bezel is configured to rotate relative to the electronic display when manipulated by the user to control a parameter of the selected operating condition,
  a sensor to determine the relative orientation of the bezel, and
  a display controller in signal communication with the sensor to obtain the relative orientation of the bezel and modulate the GUI to display a value for the parameter of the selected operating condition that corresponds to the relative orientation of the bezel,
wherein, following a selection by the user of the constant power output icon, the controller is configured to cause the heat source to provide a constant power output to the cooking vessel or contents of the cooking vessel,
wherein, following a selection by the user of the predetermined temperature icon, the controller is configured to cause the heat source to provide sufficient power to maintain a predetermined temperature in the cooking vessel or contents of the cooking vessel, and wherein, following the selection by the user of the predetermined temperature icon, the GUI is further configured to alternate between displaying the value for the predetermined temperature and at least one of a word or abbreviation for a cooking phase associated with the predetermined temperature.

4. The cooking appliance of claim 3, further comprising the cooking vessel, wherein the cooking vessel has a thermal sensor to measure the temperature and a transmitter to transmit a temperature measured by the thermal sensor in which the controller has or is in signal communication with a receiver that receives the measured temperature from the transmitter.

5. The cooking appliance of claim 3, wherein, following the selection by the user of the constant power output icon, the relative orientation of the bezel is operative to select a value of the constant power output and the GUI is configured to display an indication of the selected value of the constant power output in response to the relative orientation of the bezel.

6. The cooking appliance of claim 3, wherein, following the selection by the user of the predetermined temperature icon, the relative orientation of the bezel is operative to select the predetermined temperature.

7. The cooking appliance of claim 6, further comprising the cooking vessel, wherein the cooking vessel has a thermal sensor to measure the temperature and a transmitter to transmit a temperature measured by the thermal sensor in which the controller has or is in signal communication with a receiver that receives the measured temperature from the transmitter.

8. The cooking appliance of claim 3, wherein the GUI is further configured to display an icon for deactivation of the heat source, and wherein contact with the deactivation icon causes the controller to deactivate the heat source.

9. The cooking appliance of claim 3, wherein the GUI is further configured to display an icon for activation of the heat source, and wherein contact with the activation icon causes the controller to activate the heat source.

10. The cooking appliance of claim 3, wherein the heat source comprises a gas burner, and the controller is configured to control the output of the heat source by controlling a valve that modifies gas flow to the gas burner.

11. The cooking appliance of claim 3, wherein the heat source comprises a heat source powered by electrical energy and the controller is configured to control the output of the heat source by modifying electrical current supplied to the heat source.

12. The cooking appliance of claim 11, wherein the heat source powered by electrical energy is selected from one or more of an induction coil, an infrared light emitting lamp, or a thermal resistance heating element.

13. A control knob configured to select an operating condition of a plurality of operating conditions of a controller configured to control an output of a heat source of a cooking appliance, the control knob comprising:

an electronic display screen, wherein at least a portion of the electronic display screen is touch sensitive to provide a graphic user interface (GUI) to interface a user with one or more operations of the control knob, wherein the GUI is configured to display a plurality of icons on the touch sensitive portion of the electronic display screen to be responsive to contact of the user, wherein contacting one of the plurality of icons by the user selects one of the plurality of operating conditions, wherein the plurality of icons comprise a constant power output icon that is associated with a constant power output operating condition of the plurality of operating conditions, and further comprise a predetermined temperature icon that is associated with a predetermined temperature operating condition of the plurality of operating conditions, a bezel positioned around the electronic display, wherein the bezel is configured to rotate relative to the electronic display when manipulated by the user to control a parameter of the selected operating condition, a sensor to determine the relative orientation of the bezel, and a display controller in signal communication with the sensor to obtain the relative orientation of the bezel and modulate the GUI to display a value for the parameter of the selected operating condition that corresponds to the relative orientation of the bezel, wherein, following a selection by the user of the constant power output icon, the relative orientation of the bezel is operative to select a value for the constant power output to be provided by the heat source, and the GUI is configured to display an indication of the selected value for the constant power output to be provided by the heat source in response to the relative orientation of the bezel, and wherein, following a selection by the user of the predetermined temperature icon, the relative orientation of the bezel is operative to select the predetermined temperature that the heat source is configured to heat a cooking vessel or contents of the cooking vessel to, and the GUI is configured to alternate between displaying the predetermined temperature and at least one of a word and abbreviation for a cooking phase associated with the predetermined temperature.

* * * * *